United States Patent [19]

Dosmann

[11] 4,210,102
[45] Jul. 1, 1980

[54] SPACE HEATER HEAT RECOVERY SYSTEM

[76] Inventor: Joseph B. Dosmann, 116 North Hill St., South Bend, Ind. 46601

[21] Appl. No.: 961,613

[22] Filed: Nov. 17, 1978

[51] Int. Cl.² .................. F22B 33/00; F24D 3/08; F24D 9/02
[52] U.S. Cl. .................. 122/20 B; 122/421; 126/101; 165/DIG. 2; 237/19
[58] Field of Search .................. 122/20 B, 412, 421; 237/19, 53, 55, 59; 126/101; 165/DIG. 2

[56] References Cited

U.S. PATENT DOCUMENTS

| 1,633,759 | 6/1927 | Breese, Jr. | 122/20 B |
| 2,020,686 | 11/1935 | Kaiser | 122/20 B |
| 3,980,071 | 9/1976 | Barber, Jr. | 126/101 |
| 4,012,191 | 3/1977 | Lisankie et al. | 165/DIG. 2 |
| 4,090,474 | 5/1978 | Kauffmann | 122/20 B |
| 4,136,731 | 1/1979 | DeBoer | 237/55 |
| 4,147,301 | 4/1979 | Halma et al. | 126/101 |

Primary Examiner—Henry C. Yuen
Attorney, Agent, or Firm—Marmaduke A. Hobbs

[57] ABSTRACT

A space heater with a heat recovery system in which the exhaust gases from the hot air furnace are passed through a heat exchanger in which a set of water heating coils is disposed. The set of coils is connected to a hot water holding tank which is in turn connected to a bank of heat exchanger coils in the heated air outlet of the furnace. A damper is provided in the exhaust pipe of the furnace and a pipe connects the exhaust pipe on the anterior side of the damper with the heat exchanger, and a pipe connects the chamber with the exhaust pipe on the posterior side of the damper. A pump is provided for circulating the water between the first set of coils and the holding tank, and a fan forces the air form the exhaust pipe through the chamber in the heat exchanger. The pump and fan are controlled by a switch responsive to the operation of the furnace. The holding tank may be used to heat water supplied to a hot water heater of a hot water supply system.

8 Claims, 1 Drawing Figure

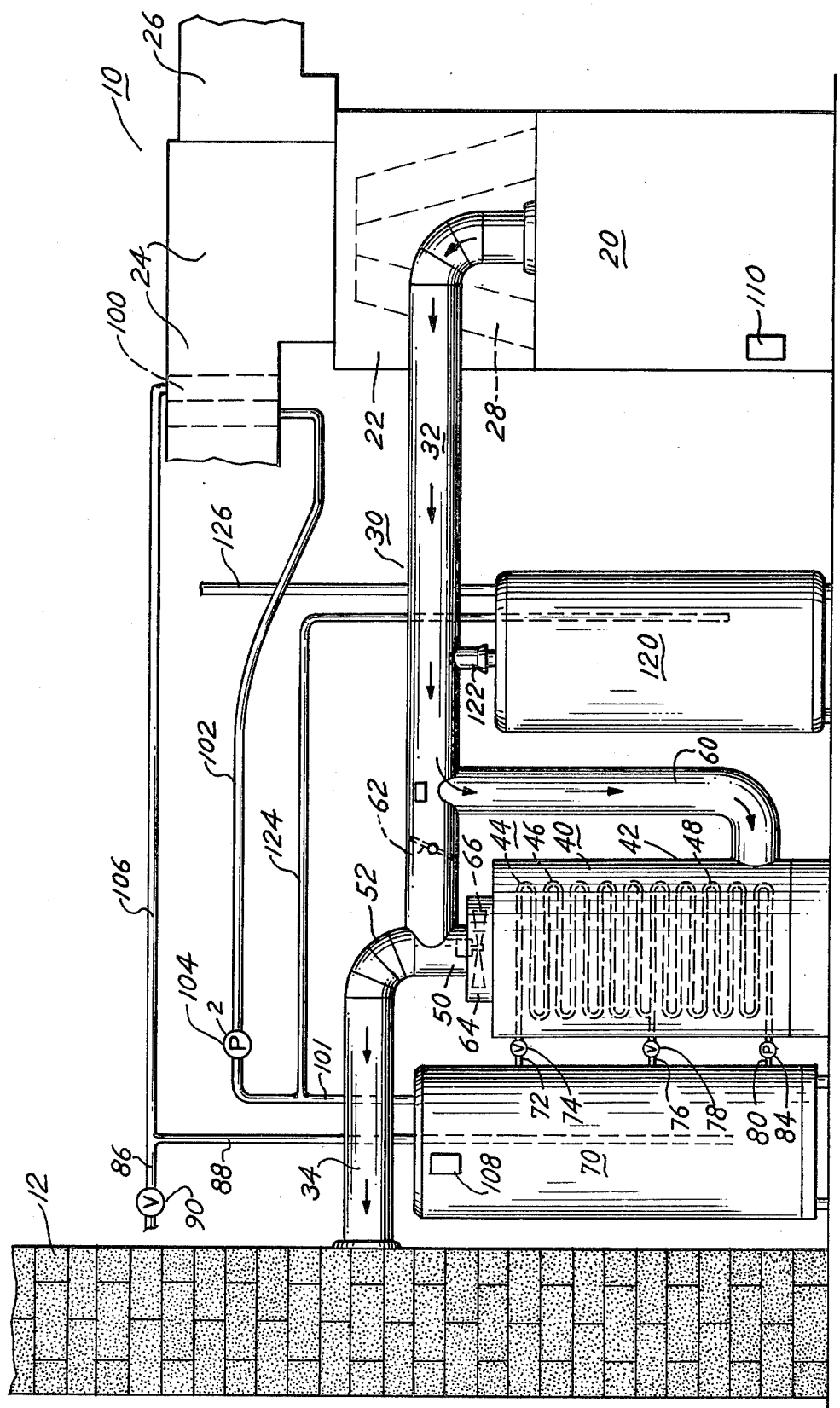

SPACE HEATER HEAT RECOVERY SYSTEM

It is a well recognized problem in space heating systems for homes and in many commercial, industrial and recreational buildings, using oil or gas as the primary fuel for the source of heat, that a substantial portion of the heat generated by the combustion of the oil or gas is lost through the flue and discharged into the atmosphere. In the home, where this type of heating system is most often used, the furnace in the system is placed in a basement or in a utility room, and air heated by the furnace is conveyed through forced air conduits to the various rooms of the home, and the hot combustion gases pass directly from the heat exchanger in the furnace to the chimney, usually through a short exhaust pipe. Attempts have been made in the past to develop a system for use with furnaces of the foregoing type which would efficiently recover the heat passing from the furnace to the chimney, and these attempts have involved the use of a heat exchanger in the exhaust system of the furnace coupled with a hot water storage tank; however, these prior systems have generally been unsatisfactory in that the heat recovery systems are expensive to install and the heat recovery efficiency has been too low to justify the expense of and space required for the installation. It is therefore one of the principal objects of the present invention to provide a hot air type space heating system with a heat recovery system, which is so constructed and designed that it is efficient in extracting the heat from the furnace exhaust and releasing the heat in the air passing from a hot air furnace to the room or other space to be heated, and which is compact in construction and can be installed in areas of limited space.

Another object of the invention is to provide a heat recovery system for space heating, which can be constantly utilized to heat water for use in the hot water supply system of the home and simultaneously utilized intermittently to heat the air flowing from the furnace to the rooms of other space being heated, and which will perform the various operations automatically in response to heating requirements and conditions.

Still another object of the invention is to provide a heat recovery system for use with a furnace, which has a versatile and efficient heat exchanging unit and can be varied in capacity as temperature conditions require, and which is simple in construction and operation and can be manually or automatically controlled to provide the desired requirements for the hot air delivery system and/or for the hot water system of the home.

A further object is to provide a space heating system of the aforesaid type which minimizes the loss of heat through the flue and is particularly adapted for the hot air type space heating system utilizing an oil or gas furnace.

Additional objects and advantages of the present invention will become apparent from the following description and accompanying drawing, wherein:

The FIGURE is an elevational view of the system with the component parts of the system being rearranged to illustrate more effectively the operational relationship of the parts constituting the system.

Referring more specifically to the drawing, the FIGURE illustrates one embodiment of the present space heating system with a heat recovery system incorporated therein, with the system 10 being shown installed in a basement or utility room and connected to a chimney 12. It may be installed in various other places and the components rearranged to suit the space in which the installation is made, without functionally changing the system. The system shown in the drawing consists of a hot air furnace 20 having a conventional heat exchanger (not shown) and fired by either gas or oil, and a bonnet 22 connected to the rooms or other space to be heated by one or more conduits 24. The air is drawn from the room through cold air duct 26 and, after passing around the heat exchanger in the furnace, is discharged through hot air duct or ducts 24. A fan incorporated in the furnace provides forced circulation of the air between the furnace and the rooms or other space to be heated. Air conditioning coils 28 are shown in the bonnet; however, they form no part of the present invention with the exception of providing a complete year round system for the installation. Since the furnace and the parts thereof are considered conventional for the purpose of this invention, they will not be described in detail herein. In a conventional installation, the furnace would normally be positioned a short distance from the chimney and the other elements constituting the present system would be installed in close proximity thereto.

The firebox and heat exchanger of the furnace 20 are connected to chimney 12 by an exhaust pipe indicated generally by numeral 30 and having two sections 32 and 34. The furnace installation thus far described is essentially conventional, with the exception of the type of exhaust pipe 30 used in connecting the furnace to the chimney. The heat recovery system includes a heat exchanger unit 40 having a housing 42 with a chamber therein containing a series of coils 44, the coils in the embodiment illustrated having an upper section of coils 46 and a lower section of coils 48. The purpose of the two sections of coils will be more fully described hereinafter. The chamber in the housing is connected directly to the chimney by a pipe section 50 and section 34 including elbow 52. The heat exchanger unit 40 may be of various sizes and may be either supported on the floor in the area where the system is located or supported on a stand or other supporting structure several feet above the floor. The size may be varied to adapt the heat exchanger to heating systems of various capacities and for operations under various conditions.

The hot exhaust gases are conveyed to the lower part of the chamber in heat exchanger unit 40 by a pipe 60 connected to pipe section 32 and to the lower part of the chamber in housing 42. The hot gases pass freely through the chamber in the housing and around the coils and to the chimney through pipe sections 50 and 34. A valve or damper 62 is pivotally disposed in pipe section 32 and, when closed, causes most or all of the hot gases to flow from pipe section 32 through section 66 to the heat exchanger unit 40. The damper 62 may be manually operated, or it may be power operated from and controlled by an electrical switch remote from the heating system such as in the space being heated. When the damper is opened, the hot gases from the furnace flow freely through section 32 to section 34 and thence to the chimney, and do not pass through the heat exchanger unit. In order to facilitate the movement of the hot gases from the furnace to the chimney when the heat exchanger is in operation a moter driven fan or blower 64 containing blades 66 is mounted on the top of the heat exchanger housing 42 and directly connects the chamber in the heat exchanger with pipe section 50. When the fan is in operation and the damper 62 is closed, the hot exhaust gases flow readily from pipe 32 through the heat exchanger unit and are discharged through pipe 34 into the chimney.

A holdng tank 70 for water is connected to sections 46 and 48 of coils 44 by pipe 72 having valve 74 therein, pipe 76 having valve 78 therein, and pipe 80 having pump 84 therein. The two valves may be manually or power operated, and the pump is motor driven and is controlled in a manner more specifically described hereinafter. The water circulates from the tank through one or both sections of the coils under the pressure of pump 84 and is returned to the tank through pipe 72 and/or pipe 76, where it remains until its use is required. The tank is connected to the water supply system by pipes 86 and 88, the latter pipe extending downwardly in the holding tank to a point near the bottom thereof. A valve 90 which controls the flow of water to the system is preferably included in the main line 86. The heat recovered by the heat exchanger unit 40 and held in holding tank 70, is utilized by the heating system through one or more coils or radiators 100 disposed in hot air duct or ducts 24 and connected to the upper end of the tank by pipes 101 and 102 which under the pressrue of motor driven pump 104 deliver the heated water to coils 100. Pipes 106 and 88 return the water from the coils to the holding tank. Pipe 106 is preferably connected to the system 86 which maintains a determined pressure in the system; however, the circulation of the hot water from the holding tank through coils 100 is produced by power driven pump 104. Thus when the motor driven pump 104 is energized, the heated water flows freely through pipes 101 and 102, through the coils 100 and through pipes 106 and 88 back to the tank. Since this system essentially is a closed system, the pressure maintained approximates the pressure in supply line 86; however, if any water is drawn from the system, such as by the opening of a drain valve or a leak in the system, the water is immediately replenished by the inflow of water through pipe 86 if valve 90 is open. If valve 90 is to be closed while the system is in operation, a pressure relief valve (not shown) would normally be included in the hot water system. While bank of coils 100 is shown located in the air outlet passage of the furnace, it may be located in the bonnet 22 or in inlet passage 26.

A control switch 108 which senses the temperature of the water in the holding tank may control pump 104 either alone or in combination with the furnace fan, so when the heated water circulates to heat coils 100, the furnace fan will also force the air through ducts 24 into the room. This system, including coils 100, normally would be in operation when the fire in the furnace was off.

An electric switch 110 is responsive to the operation of the furnace, i.e. when the gas or oil has been ignited, and energizes pump 84 and the motor driving fan 64. If damper 62 is in its closed position, the energization of the fan causes the hot gases to pass downwardly through pipe section 60, and thence through the chamber in heat exchanger unit 40 where the heat in the gases is absorbed by water circulating from tank 70 through coil sections 46 and 48. One of the important features of the present invention is the downwardly extending pipe 60 which permits the hot gases to accumulate in pipe section 32 when the damper is closed so that there is little loss of heat from the hot gases flowing from the furnace, in that the flow is somewhat retarded when the furnace is not in operation, thus minimizing the loss of heat through the system, as well as increasing the efficiency when the heat recovery system is in operation.

The heat recovery system is preferably connected to the hot water supply heater 20 of the home or other building being heated by the system, the hot water heater being heated either by gas or electricity so that the water therein can be maintained at the desired temperature regardless of the operation of the heat recovery system. The one shown is gas operated, and an exhaust 122 connects the hot water heater to pipe section 32. The tank 120 is connected to holding tank 70 by pipes 124 and 101, and pipe 124 extends downwardly into tank 120 near the bottom thereof. A hot water delivery pipe 126 is connected to the hot water supply system of the home or other building in which the system is used. When water is drawn from the hot water supply system, cold water flows from pipe 86 through pipe 88 to holding tank 70, and the water in holdng tank 70 flows through pipe 101 and 124 to tank 120. Thus, the hot water tank 120 operates essentially in the conventional manner with the exception that the water from the holding tank is at an elevated temperature which reduces the heat required for raising the temperature of the water in the tank 120 to the desired level.

In the operation of the present space heating system including the recovery system just described, furnace 20, which would normally be an on and off heating type of unit which is fired intermittently to heat the space, starts its heating cycle, activating control 110 which energizes fan 64 and pump 84 if damper 62 is in closed position. If the damper is in its closed position, the hot gases from the fire are drawn through pipe section 32 downwardly through pipe section 60 into and through the chamber in housing 42 by fan or blower 64 and thence are discharged through pipe 34 into the chimney. Pump 84 draws water from tank 70 and forces it through coils 46 and/or 48 and returns the water to the tank through pipes 72 and/or 76, depending on which coil sections are in use. If full heat recovery capacity is desired, the valve 74 is opened and valve 78 is closed so that the water circulates through both coil sections. If the system is operated in relatively warm weather and the full bank of coils is not required, valve 74 may be closed and valve 78 opened, thus circulating the water merely through heat exchanger section 48. Regardless of whether one or both of the sections are in operation, the remainder of the system operates the same, with the air flowing from pipe section 60 through the chamber in housing 42 and thence to the chimney through pipe 34.

The water heated in the coils 44 is stored in holding tank 70 until the heat is to be returned to the heating system. When this occurs, the pump 104 is energized, either automatically by controls on the furnace ducts or in the space to be heated, and the water is circulated from tank 70 through pipes 101 and 102, through coils 100, and returned through pipes 106 and 88 to the tank. When the heat has been substantially extracted from the water in holding tank 70 by the air passing through coils 100, the pump may automatically be shut off so that the furnace again operates in the normal manner to heat the space. The recovery system as explained hereinbefore can also be used effectively to heat the building hot water sypply system. When the system is installed in this manner, the water flows from the holding tank through pipes 101 and 124 to tank 120 where it is normally heated to a higher temperature and then delivered to the hot water supply system through pipe 126. The water withdrawn through the hot water system is replenished by cold water flowing inwardly into holding tank 70 through pipes 86 and 88. If the operation of the recovery system is not desired, the damper 62 is turned to open position so that the hot gases from the furnace flow directly from pipe section 32 to pipe section 34 and thence to the chimney, thus by-passing the heat exchanger 40.

It is seen that the heat recovery system used in conjunction with the space heating system not only improves the efficiency of the overall system by minimizing the loss of heat through the exhaust and chimney, but also effectively utilizes the heat recovered to heat either or both the space and the water in the hot water supply system. The efficiency can also be improved by providing a variation in the number of coils in the heat exchanger in unit 40 in accordance with the temperature of the ambient air and the cycling frequency of the heating system, thus minimizing the amount of condensation on the coils when the heating system is in little use but still required.

While only one embodiment of the present space heating system and modifications thereof have been described in detail herein, various changes and other modifications may be made to satisfy requirements without departing from the scope of the invention.

I claim:

1. In a space heating system having a hot air, fuel fired furnace with a cold air inlet passage and a hot air outlet passage, a heat recovery system: comprising an exhaust pipe for connecting the furnace to a flue, a damper in said exhaust pipe, a heat exchanger unit having a chamber and a set of water coils therein, said heat exchanger unit being located at least in part below said exhaust pipe, a pipe connected to said exhaust pipe on the anterior side of said damper and extending downwardly to the lower portion of said chamber, a pipe connecting the upper part of said chamber with said exhaust pipe on the posterior side of said damper, a water holding tank, upper and lower conduits connecting said tank with said set of coils, a bank of coils in one of said passages of the furnace, a fan for forcing the furnace exhaust gases through said downwardly extending pipe and the chamber in said heat exchanger unit and returning the gases to said exhaust pipe and water supply and return conduits connecting said holding tanks with said bank of coils for heating the air flowing to the space to be heated.

2. A space heater with a heat recovery system as defined in claim 1 in which a pump is disposed in one of said upper and lower conduits connecting said tank with said set of coils, and thermostatic switch means responsive to the operation of said furnace controls said pump.

3. A space heater with a heat recovery system as defined in claim 1 in which a pump is disposed in one of the water supply and return conduits connecting the holding tank with said bank of coils.

4. A space heater with a heat recovery system as defined in claim 2 in which a pump is disposed in one of the water supply and return conduits connecting the holding tank with said bank of coils.

5. A space heater with a heat recovery system as defined in claim 1 in which a hot water supply tank is included in the system, and a cold water supply conduit connects said holding tank with a source of water; a conduit connects said holding tank with said hot water supply tank; and a conduit delivers water from said hot water supply tank.

6. A space heater with a heat recovery system as defined in claim 4 in which a hot water supply tank is included in the system and a cold water supply conduit connects said holding tank with a source of water; a conduit connects said holding tank with said hot water supply tank; and a conduit delivers water from said hot water supply tank.

7. A space heater with a heat recovery system as defined in claim 1 in which said set of coils has two sections which can be used separately or in combination with one another.

8. A space heater with a heat recovery system as defined in claim 5 in which a pump is disposed in one of the water supply return conduits connecting the holding tank with said bank of coils.

* * * * *